(12) United States Patent
Verhoog

(10) Patent No.: US 10,024,411 B2
(45) Date of Patent: Jul. 17, 2018

(54) HYDROKINETIC TORQUE COUPLING DEVICE HAVING TURBINE-PISTON LOCK-UP CLUTCH, AND RELATED METHODS

(71) Applicant: VALEO EMBRAYAGES, Amiens (FR)

(72) Inventor: Roel Verhoog, Gournay sur Aronde (FR)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 15/224,119

(22) Filed: Jul. 29, 2016

(65) Prior Publication Data

US 2018/0031099 A1 Feb. 1, 2018

(51) Int. Cl.
*F16H 45/02* (2006.01)
*F16D 25/0635* (2006.01)

(52) U.S. Cl.
CPC ......... *F16H 45/02* (2013.01); *F16D 25/0635* (2013.01); *F16H 2045/0221* (2013.01); *F16H 2045/0294* (2013.01)

(58) Field of Classification Search
CPC ............. F16H 45/02; F16H 2045/0221; F16H 2045/0294; F16H 2045/0226; F16D 25/0635
See application file for complete search history.

(56) References Cited

U.S. PATENT DOCUMENTS

| 2,130,895 A | 9/1938 | Ness |
| 2,860,747 A | 11/1958 | Kelley |
| 2,992,713 A | 7/1961 | Stump et al. |

(Continued)

FOREIGN PATENT DOCUMENTS

| DE | 2245901 A1 | 4/1974 |
| DE | 10226860 A1 | 12/2003 |

(Continued)

OTHER PUBLICATIONS

JP 2006/200607A, machine translation,—Yamashita (Mar. 3, 2006).*

(Continued)

*Primary Examiner* — Jacob S. Scott
*Assistant Examiner* — Tinh Dang
(74) *Attorney, Agent, or Firm* — Berenato & White, LLC

(57) ABSTRACT

A hydrokinetic torque coupling device features a casing comprising a casing shell and an impeller shell, an impeller, a turbine-piston, a damper assembly comprising a drive member non-moveably connected to the turbine-piston and a driven member elastically coupled to the drive member, and a clutch member comprising a clutch plate and a connecting member extending through the damper assembly and non-moveably interconnecting the clutch plate with the turbine-piston. The clutch plate has an axially outer surface facing an engagement surface of the casing. The turbine-piston is axially displaceable relative to the casing to move the clutch member axially toward and away from the engagement surface of the casing for positioning the hydrokinetic torque coupling device into and out of a lockup mode in which the clutch member and the casing frictionally interlock with one another so that the casing is non-rotatable relative to the turbine-piston.

18 Claims, 11 Drawing Sheets

(56) References Cited

U.S. PATENT DOCUMENTS

| | | | |
|---|---|---|---|
| 3,041,892 A | 7/1962 | Schjolin | |
| 3,252,352 A | 5/1966 | General et al. | |
| 4,041,701 A | 8/1977 | Goto et al. | |
| 5,713,442 A | 2/1998 | Murata et al. | |
| 5,813,505 A | 9/1998 | Olsen et al. | |
| 6,026,940 A | 2/2000 | Sudau | |
| 6,102,174 A * | 8/2000 | Sasse | F16H 45/02 192/3.25 |
| 6,540,053 B2 * | 4/2003 | Sasse | F16H 45/02 192/3.29 |
| 6,622,834 B2 * | 9/2003 | Bornschier | F16H 45/02 192/212 |
| 6,640,945 B2 * | 11/2003 | Arhab | F16H 45/02 192/3.29 |
| 6,915,886 B2 | 7/2005 | Dacho et al. | |
| 7,191,879 B2 | 3/2007 | Arhab et al. | |
| 7,445,099 B2 | 11/2008 | Maucher et al. | |
| 7,770,703 B2 * | 8/2010 | Mauti | F16H 45/02 192/3.29 |
| 8,276,723 B2 | 10/2012 | Verhoog et al. | |
| 8,967,349 B2 * | 3/2015 | Ushio | F16H 45/02 192/3.29 |
| 9,200,685 B2 * | 12/2015 | Ushio | F16H 45/02 |
| 9,267,555 B2 * | 2/2016 | Ushio | F16H 45/02 |
| 9,297,448 B1 | 3/2016 | Depraete et al. | |
| 9,341,250 B1 | 5/2016 | Depraete et al. | |
| 9,574,649 B2 * | 2/2017 | Lee | F16H 45/02 |
| 2003/0168298 A1 | 9/2003 | Holler et al. | |
| 2003/0168299 A1 | 9/2003 | Holler et al. | |
| 2004/0011032 A1 | 1/2004 | Holler et al. | |
| 2006/0086584 A1 | 4/2006 | Maucher et al. | |
| 2013/0230385 A1 | 9/2013 | Lindemann et al. | |
| 2014/0014454 A1 | 1/2014 | Davis | |
| 2014/0014455 A1 | 1/2014 | Davis | |
| 2014/0097055 A1 | 4/2014 | Lindemann et al. | |
| 2014/0110207 A1 | 4/2014 | Davis | |
| 2015/0362041 A1 | 12/2015 | Lee et al. | |
| 2016/0102743 A1 | 4/2016 | Depraete et al. | |
| 2016/0102746 A1 | 4/2016 | Depraete et al. | |
| 2016/0116037 A1 | 4/2016 | Depraete et al. | |
| 2016/0116038 A1 | 4/2016 | Depraete et al. | |
| 2016/0116039 A1 | 4/2016 | Depraete et al. | |
| 2016/0116040 A1 | 4/2016 | Werthman et al. | |
| 2016/0116041 A1 | 4/2016 | Depraete | |
| 2016/0116042 A1 | 4/2016 | Depraete | |
| 2016/0160971 A1 | 6/2016 | Depraete et al. | |
| 2016/0160972 A1 | 6/2016 | Depraete et al. | |
| 2016/0160973 A1 | 6/2016 | Depraete et al. | |
| 2016/0160975 A1 | 6/2016 | Depraete et al. | |
| 2016/0160977 A1 | 6/2016 | Depraete | |
| 2016/0160978 A1 | 6/2016 | Depraete | |

FOREIGN PATENT DOCUMENTS

| | | | |
|---|---|---|---|
| EP | 0125428 A1 | 11/1984 | |
| EP | 1744074 | 1/2007 | |
| FR | 2317556 A1 | 2/1977 | |
| FR | 2428188 A1 | 1/1980 | |
| FR | 2561342 A1 | 9/1985 | |
| FR | 2736982 A1 | 1/1997 | |
| FR | 2787854 A1 | 6/2000 | |
| JP | S58-131466 A | 8/1983 | |
| JP | 08312749 A * | 11/1996 | F16H 45/02 |
| JP | 2006200607 A * | 8/2006 | F16H 45/02 |
| WO | WO2004018897 | 3/2004 | |
| WO | WO2004046574 A1 | 6/2004 | |

OTHER PUBLICATIONS

JP-08312749-A (English abstract)—Kumada (Nov. 26, 1996).*

Lindemann et al., "iTC—Innovative Solutions for Torque Converters Pave the Way into the Future", Torque Converter, Schaeffler Symposium book 2014, pp. 280-301, Schaeffler Technologies AG & Co. KG.

U.S. Appl. No. 14/687,602, filed Apr. 15, 2015, First Named Inventor: Alexandre Depraete.

U.S. Appl. No. 15/133,587, filed Apr. 20, 2016.

* cited by examiner

HYDROKINETIC TORQUE COUPLING DEVICE HAVING TURBINE-PISTON LOCK-UP CLUTCH, AND RELATED METHODS

BACKGROUND OF THE INVENTION

1. Field of the Invention

The present invention generally relates to hydrokinetic torque coupling devices, and more particularly to a hydrokinetic torque coupling device including a turbine-piston lock-up clutch for mechanically coupling driving and driven shafts.

2. Background of the Invention

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lock-up clutches and their operation are described in, for example, U.S. Pat. No. 8,276,723 and U.S. Pat. No. 7,191,879.

Depending on conditions, when the hydrokinetic torque coupling device is transmitting the rotational movement through lock-up operation, the action of the transmission fluid generates axial forces, which tend to move the turbine-piston away from the impeller, especially in coasting conditions of the motor vehicle when the transmission is at a higher rotational speed than the engine. These conditions frequently occur during downhill driving, for example. These forces vary depending on various factors, such as the speed and torque. Under some stable or transient conditions, these forces may move the turbine-piston away from the impeller and untimely or prematurely disengage the lock-up in unexpected circumstances, when it is not desired. This can also create a load that unable to engage the lock-up in the coasting condition of the motor vehicle.

While hydrokinetic torque coupling devices with lock-up clutches have proven to be acceptable for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, a hydrokinetic torque coupling device is provided for coupling a driving shaft and a driven shaft. The torque coupling device comprises a casing rotatable about a rotational axis and comprising a casing shell and an impeller shell disposed axially opposite to and fixedly connected to the casing shell, an impeller coaxially aligned with the rotational axis and comprising the impeller shell, a turbine-piston coaxially aligned with and hydro-dynamically drivable by the impeller, a damper assembly and a clutch member. The casing has an engagement surface. The damper assembly comprises a drive member non-moveably connected to the turbine-piston and a driven member elastically coupled to the drive member. The clutch member comprises a clutch plate and a connecting member extending through the damper assembly and non-moveably interconnecting the clutch plate with the turbine-piston. The clutch plate has an axially outer surface facing the engagement surface of the casing. The turbine-piston is axially displaceable relative to the casing to move the axially outer surface of the clutch member axially toward and away from the engagement surface of the casing, for positioning the hydrokinetic torque coupling device into and out of a lockup mode in which the clutch member and the casing frictionally interlock with one another, so that the casing is mechanically locked to and non-rotatable relative to the turbine-piston.

According to a second aspect of the invention, a method is provided for assembling a hydrokinetic torque coupling device for coupling a driving shaft and a driven shaft together. The method involves providing a torque converter comprising an impeller and a turbine-piston coaxially aligned with and hydrodynamically drivable by the impeller, providing a damper assembly comprising a drive member non-moveably connected to the turbine-piston and a driven member elastically coupled to the drive member, providing a clutch member comprising a clutch plate and a connecting member, non-moveably securing the drive member of the damper assembly to the turbine-piston, non-moveably securing the connecting member of the clutch member to the turbine-piston, mounting the driven member of the damper assembly to the drive member through the elastic damping members by extending the connecting member of the clutch member through the damper assembly, and non-moveably securing the clutch plate to the connecting member.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1A:
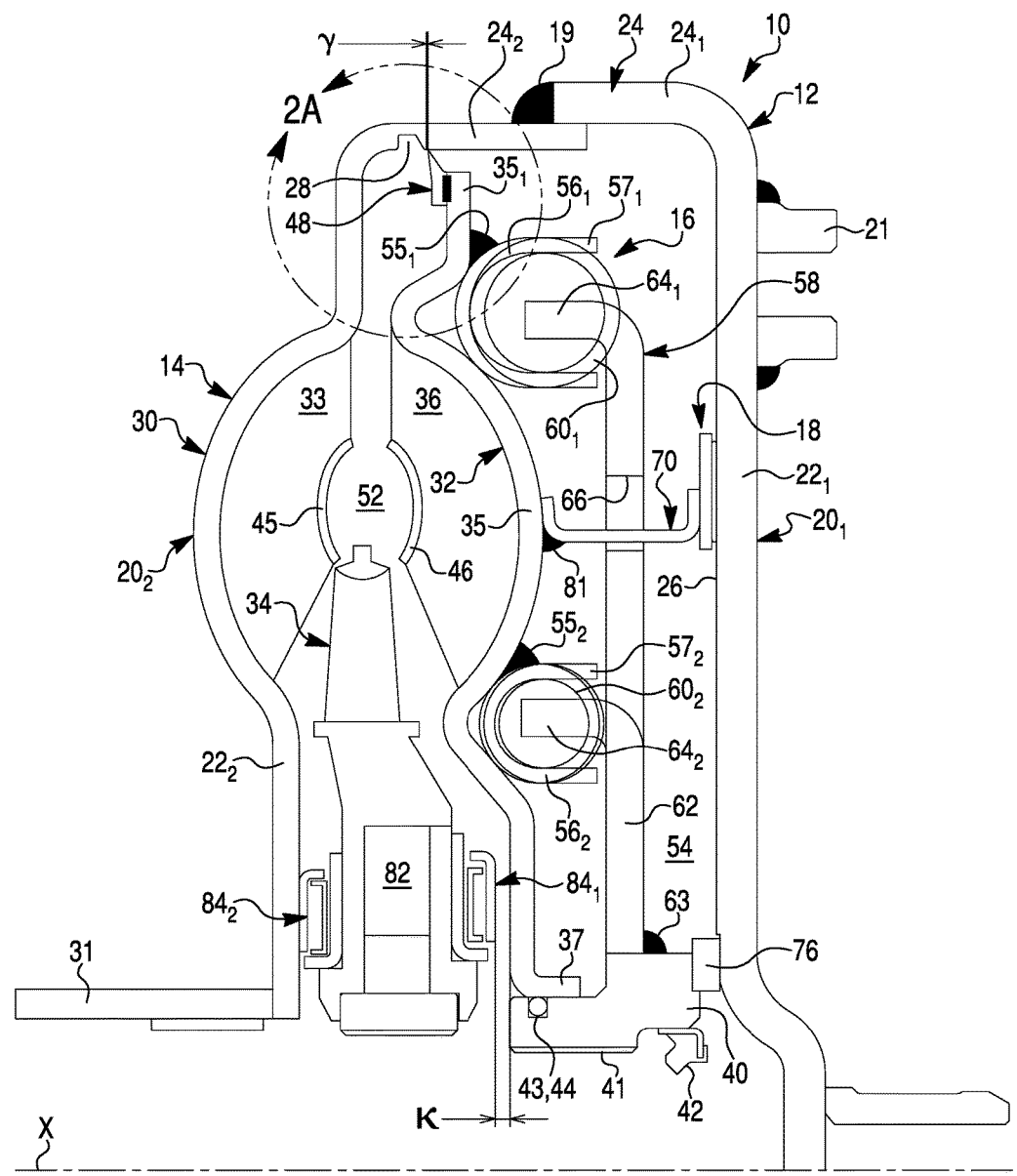
FIG. 1A is a fragmented half-view in axial section of a hydrokinetic torque coupling device in accordance with an exemplary embodiment of the present invention in a lock-up mode.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

A first exemplary embodiment of a hydrokinetic torque coupling device is generally represented in the accompanying drawings by reference numeral 10, as best shown in the fragmentary sectional view in FIG. 1A. The hydrokinetic torque coupling device 10 is operable in known manner to fluidly couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a torque converter 14, a torsional vibration damper (also referred to herein as a damper assembly) 16, and a friction locking clutch 18 are all rotatable about a rotational axis X. The drawings discussed herein show half-views, that is, the portion or fragment of the hydrokinetic torque coupling device 10 above the rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

Figure 1B:
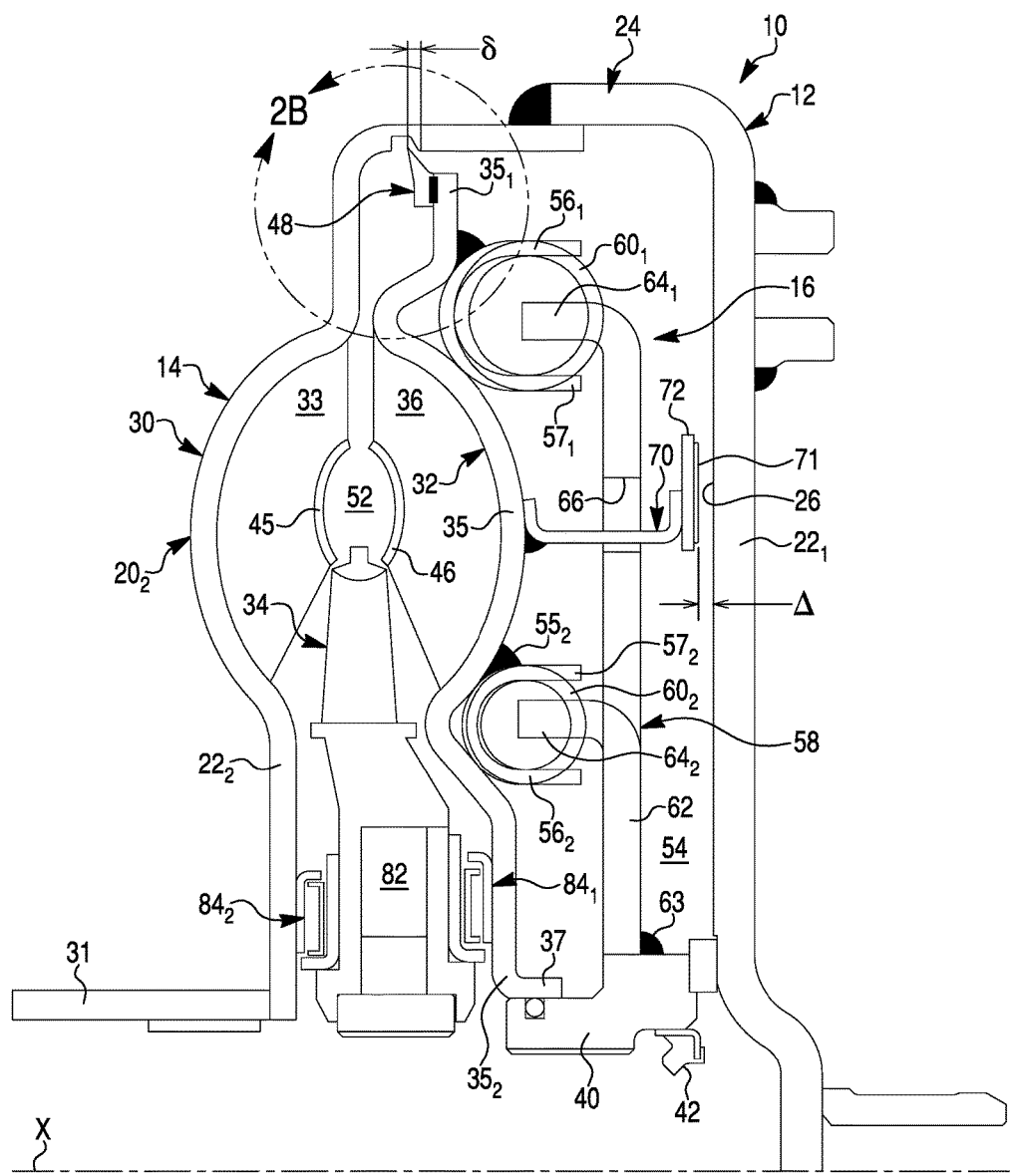
FIG. 1B is a fragmented half-view in axial section of the hydrokinetic torque coupling device in accordance with the exemplary embodiment of the present invention in a non-lock-up mode.

The sealed casing 12 according to the exemplary embodiment as illustrated in FIGS. 1A and 1B includes a first casing shell (or cover shell) $20_1$ and a second casing shell $20_2$ non-movably (i.e., fixedly) interconnected sealingly together, such as by welding at weld 19, at their outer peripheries, and non-movable relative to one another yet rotatable about the rotational axis X. The first casing shell $20_1$ is non-movably (i.e., fixedly) interconnected to the driving shaft, more typically to a flywheel (not shown) that is fixed so as to be non-rotatable relative to the driving shaft, so that the casing 12 turns at the same speed that the engine operates for transmitting torque. Specifically, in the illustrated embodiment of FIG. 1A the casing 12 is rotatably driven by the internal combustion engine and is non-rotatably coupled to the flywheel thereof with studs 21, shown in FIG. 1A. Each of the first and second casing shells $20_1$, $20_2$ may be made, for example, integrally by press-forming one-piece metal sheets.

The first casing shell $20_1$ includes a first sidewall $22_1$ extending substantially radially relative to the direction from the rotational axis X (i.e., in a plane that is generally transverse to the rotational axis X) and a cylindrical first outer wall $24_1$ extending substantially axially from the first sidewall $22_1$ toward the second casing shell $22_2$. Similarly, the second casing shell $20_2$ includes a second sidewall $22_2$ extending substantially radially relative to the direction from the rotational axis X and a cylindrical second outer wall $24_2$ extending substantially axially from the second sidewall $22_2$ toward the first casing shell $20_1$. The weld 19 fixedly secures the outer walls $24_1$ and $24_2$ together. The first sidewall $22_1$ has an engagement surface 26 facing the torque converter 14 and the damper assembly 16 within the casing 12, best shown in FIG. 1A. The first and second outer walls $24_1$, $24_2$ collectively establish an annular outer wall portion 24 of the casing 12, which is substantially parallel to the rotational axis X. The annular outer wall portion 24 of the casing 12 has a radially inner cylindrical surface 25.

The torque converter 14 includes an impeller (sometimes referred to as the pump or impeller wheel) 30, a turbine-piston 32, and a stator (sometimes referred to as the reactor) 34 interposed axially between the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydro-dynamically) coupled to one another as known in the art.

The second casing shell $20_2$ of the casing 12 also forms and serves as an impeller shell of the impeller 30. Accordingly, the impeller shell 20 sometimes is referred to as part of the casing 12. The impeller 30 further includes a core ring 45, and a plurality of impeller blades 33 fixedly attached, such as by brazing, to the impeller shell $20_2$ and the core ring 45. The impeller 30, including the impeller shell $20_2$, the core ring 45, and the blades 33, are fixedly secured so as to be non-rotatable relative to the first casing shell $20_1$ and hence to the drive shaft (or flywheel) of the engine to rotate at the same speed as the engine output. The impeller 30 also includes an impeller hub 31 fixedly secured to the impeller shell $20_2$. The impeller hub 31 is arranged for engagement with a hydraulic pump of the transmission.

The torque coupling device 10 further includes an output hub 40 that is rotatable about the rotational axis X. The output hub 40 is operatively coupled to and coaxial with the driven shaft. For example, as best shown in FIGS. 1A and 1B, the output hub 40 may be provided with internal splines 41 for coupling the output hub 40 non-rotatably relative to the driven shaft, such as a transmission input shaft provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. A sealing member 42, mounted to a radially inner peripheral surface of the output hub 40, creates a seal at the interface of a transmission input shaft and the output hub 40. A thrust bearing 76 is positioned between the output hub 40 and the first casing shell $20_1$.

The turbine-piston 32 is a consolidation or incorporation of a turbine with a lockup clutch piston. The turbine component of the turbine-piston 32 includes a substantially toroidal turbine-piston shell 35, a core ring 46, and a plurality of turbine blades 36 fixedly attached, such as by brazing, to the turbine-piston shell 35 and the core ring 46. The rotation of the impeller 30 causes transmission fluid in the torus to rotate the turbine blades 36, and hence the turbine-piston shell 35.

The impeller shell $20_2$ and the turbine-piston shell 35 collectively define a substantially toroidal first pressure chamber (or torus chamber) 52 therebetween. Referring to FIGS. 1A and 1B, the torus chamber 52 is to the left side of the turbine-piston shell 35, and a second pressure chamber (or damper chamber) 54 is to the other (right) side of the turbine-piston shell 35. In other words, the first chamber 52 is defined between the impeller shell $20_2$ and the turbine-piston shell 35, while the second chamber 54 is defined between the turbine-piston shell 35 and the first casing shell $20_1$.

The stator 34 is positioned between the impeller 30 and turbine-piston 32 to redirect fluid from the turbine-piston 32 back to the impeller 30 in an efficient manner. The stator 34 is typically mounted on a one-way clutch 82 to prevent the stator 34 from counter-rotation. A first thrust bearing $84_1$ is interposed between the stator 34 and the turbine-piston shell 35, while a second thrust bearing $84_2$ is interposed between the stator 34 and the impeller shell $20_2$ of the casing 12.

The turbine-piston shell 35 radially extends between a radially outer peripheral end $35_1$ and a radially inner peripheral end $35_2$. Extending axially at the radially inner peripheral end $35_2$ of the turbine-piston shell 35 is a substantially cylindrical proximal flange 37 that is proximate to the rotational axis X. The radially outer peripheral end $35_1$ is distal to the rotational axis X relative to the above-discussed proximal flange 37. The cylindrical proximal flange 37 of the turbine-piston 32 is rotatable relative to the output hub 40. The sealing member (e.g., O-ring) 44 creates a seal at the interface of the cylindrical proximal flange 37 and the output hub 40. As discussed in further detail below, the turbine-piston 32 is axially movable relative to the output hub 40 along this interface respectively into and out of a lockup mode of the locking clutch 18.

In other words, the turbine-piston 32 is axially movable relative to the output hub 40 relative to the rotational axis X between the lockup mode (an engaged position) of the locking clutch 18, in which the turbine-piston 32 and the casing 12 are non-rotatably coupled together, and a non-lockup mode (a disengaged position) of the locking clutch 18, in which the turbine-piston 32 and the impeller 30 are rotatable relative to one another. Although not shown, a bearing may be placed at the interface of the proximal flange 37 and the output hub 40.

The torsional vibration damper 16 is housed in the casing 12 axially between the turbine-piston 32 and the first sidewall $22_1$ of the casing 12, as shown in FIGS. 1A and 1B. The torsional vibration damper 16 includes at least one drive (or input) member ($56_1$, $56_2$ discussed below), at least one set of circumferential elastic damping members, and a driven (or output) member 58. According to the exemplary embodiment of FIGS. 1A and 1B, the torsional vibration damper 16 includes first and second substantially annular drive members $56_1$ and $56_2$, and first and second circumferential elastic damping members $60_1$ and $60_2$, respectively. As shown in FIGS. 1A and 1B, the annular first and second drive members $56_1$ and $56_2$ as well as the first and second circumferential elastic damping members $60_1$ and $60_2$ are radially spaced from one another. Moreover, the driven member 58 is elastically coupled to the first and second drive members $56_1$ and $56_2$ through the first and second elastic damping members $60_1$ and $60_2$, respectively. According to the exemplary embodiment of FIGS. 1A and 1B, the first and second elastic damping members $60_1$ and $60_2$ are configured as helical (or coil) springs having a principal axis oriented substantially circumferentially. Other elastic members may be selected to replace or supplement the springs $60_1$ and $60_2$. As shown in FIGS. 1A and 1B, the first elastic damping members $60_1$ are different (for example, have larger diameter and length) from the second elastic damping members $60_2$.

The first and second drive members $56_1$ and $56_2$, and the first and second elastic members $60_1$ and $60_2$ are substantially structurally identical in the exemplary embodiment. In view of these similarities, and in the interest of simplicity, the following discussion will sometimes use a reference numeral without a character designating an entire group of substantially identical structures. For example, the reference numeral 56 will be used when generically referring to each of the first and second drive members $56_1$ and $56_2$ rather than reciting all two reference numerals. Similarly, the reference numeral 60 will be used when generically referring to each of the first and second elastic members $60_1$ and $60_2$ rather than reciting all two reference numerals.

Each of the first and second drive members $56_1$ and $56_2$ is fixedly (i.e., non-moveably) connected to the turbine-piston shell 35 of the turbine-piston 32, such as by welding, which may be continuous annular welds or spot welds $55_1$ and $55_2$, respectively, or mechanical fasteners, to extend outside of the torus chamber 52. An output side of each of the first and second drive members $56_1$ and $56_2$ has a plurality of integral first and second driving arms (or spring engagement portions) $57_1$ and $57_2$, respectively (FIGS. 1A and 1B) extending axially in the direction away from the turbine-piston 32. In other words, the first and second driving arms $57_1$ and $57_2$ are formed unitary with (i.e., non-moveable relative to) the first and second drive members $56_1$ and $56_2$, respectively. The first and second spring engagement portions $57_1$ and $57_2$ of the first and second drive members $56_1$ and $56_2$ are circumferentially equidistantly spaced from one another, and engage circumferential ends of the first and second elastic damping members $60_1$ and $60_2$, respectively. In view of these similarities of the first and second driving arms $57_1$ and $57_2$, and in the interest of simplicity, the following discussion will sometimes use the reference numeral 57 when generically referring to each of the first and second driving arms $57_1$ and $57_2$.

Figure 3:
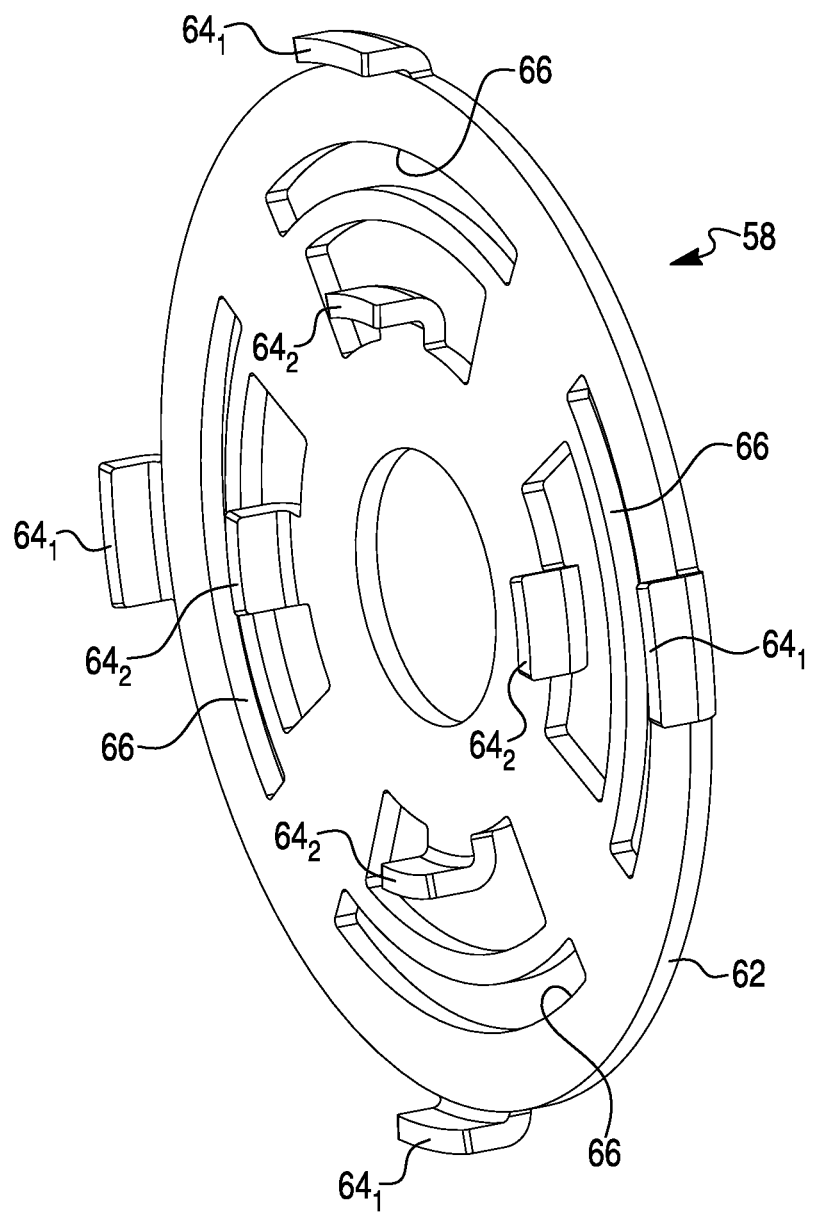
FIG. 3 is a perspective view of a driven member of a torsional vibration damper in accordance with the exemplary embodiment of the present invention.

The driven member 58 includes a substantially annular driven plate 62 generally orthogonal to the rotational axis X, and at least one set of driven arms extending axially from the driven plate 62. According to the exemplary embodiment of FIGS. 1A and 1B, the driven member 58 includes integral first and second driven arms (or spring engagement portions) $64_1$ and $64_2$, respectively, radially spaced from one another and extending axially from the driven plate 62 in an opposite direction to the first and second driving arms $57_1$ and $57_2$ of the first and second drive members $56_1$ and $56_2$, respectively. In other words, the first and second driven arms $64_1$ and $64_2$ are formed unitary with (i.e., non-moveable relative to) the driven plate 62 of the driven member 58. The driven plate 62 and the driven arms $64_1$ and $64_2$ of the driven member 58 are embodied as integral with one another, e.g., made of a single or unitary component (as best shown in FIG. 3), but may be separate components non-moveably connected together. The driven member 58 may be for example stamped from metal as a single-piece component. The first and second driven arms $64_1$ and $64_2$ of the driven member 58 are circumferentially equidistantly spaced from one another (as best shown in FIG. 3) and engage one of circumferential ends of the first and second elastic damping members $60_1$ and $60_2$, while the first and second driving arms $57_1$ and $57_2$ of the first and second drive members $56_1$ and $56_2$ engage the opposite circumferential ends of the first and second elastic damping members $60_1$ and $60_2$. The driven member 58 of the damper assembly 16 is rotatable relative to the first and second drive members $56_1$ and $56_2$ and their driving arms $57_1$ and $57_2$ due to elasticity of the first and second elastic damping members $60_1$ and $60_2$, which absorb torsional vibration. In view of these similarities of the first and second driven arms $64_1$ and $64_2$, and in the interest of simplicity, the following discussion will sometimes use the reference numeral 64 when generically referring to each of the first and second driven arms $64_1$ and $64_2$.

The driven plate 62 of the driven member 58 is fixedly (i.e., non-movably) connected to the output hub 40, such as by welding, which may be a continuous annular weld 63, or mechanical fasteners, so as to be non-rotatable relative to the output hub 40. Alternatively, the non-rotatable connection between the driven member 58 and the output hub 40 may be formed by splines. Thus, the turbine-piston 32 is elastically coupled to the output hub 40 through the damper assembly 16. In other words, the turbine-piston 32 is rotatable relative to the output hub 40.

Moreover, the driven plate 62 of the driven member 58 is provided with a plurality of circumferentially extending slots 66 spaced circumferentially equidistantly from one another around the rotational axis X, as best shown in FIG. 3. Each of the slots 66 has a continuous, uninterrupted inner perimeter. As further illustrated in FIG. 3, the driven plate 62 according to the exemplary embodiment of the present invention has four slots 66, although other numbers are possible.

According to the exemplary embodiment, the first and second driving arms $57_1$ and $57_2$ of the first and second drive members $56_1$ and $56_2$ are axially movable relative to the first and second driven arms $64_1$ and $64_2$ of the driven member 58. This relative axial movement between the first and second driving arms $57_1$ and $57_2$ and the first and second driven arms $64_1$ and $64_2$ may become necessary during axial movement of the turbine-piston 32 between the lockup and non-lockup modes of the locking clutch 18. As discussed in greater detail below, when the turbine-piston 32 shifts axially during a lockup event, the first and second driving arms $57_1$ and $57_2$ move axially relative to the first and second driven arms $64_1$ and $64_2$. Thus, each of the first and second drive members $56_1$ and $56_2$ is both axially and circumferentially moveable relative to the driven member 58 of the damper assembly 16. Similarly, each of the first and second elastic damping members $60_1$ and $60_2$ is both axially and circumferentially moveable relative to the driven member 58 of the damper assembly 16, as illustrated in FIGS. 1A and 1B.

The driven member 58 of the torsional vibration damper 16 is not axially movable relative to the output hub 40. The axial movement between the first and second drive members $56_1$ and $56_2$ relative to the first and second driven arms $64_1$ and $64_2$ of the driven member 58 allows the driven member 58 to remain fixed axially, while the turbine-piston 32 and the first and second drive members $56_1$ and $56_2$ are both axially and circumferentially moveable relative to the driven member 58 of the damper assembly 16. In both the lockup and non-lockup modes, the first and second drive members $56_1$ and $56_2$ are configured to rotationally drive the damper assembly 16 and the output hub 40.

Figure 4:
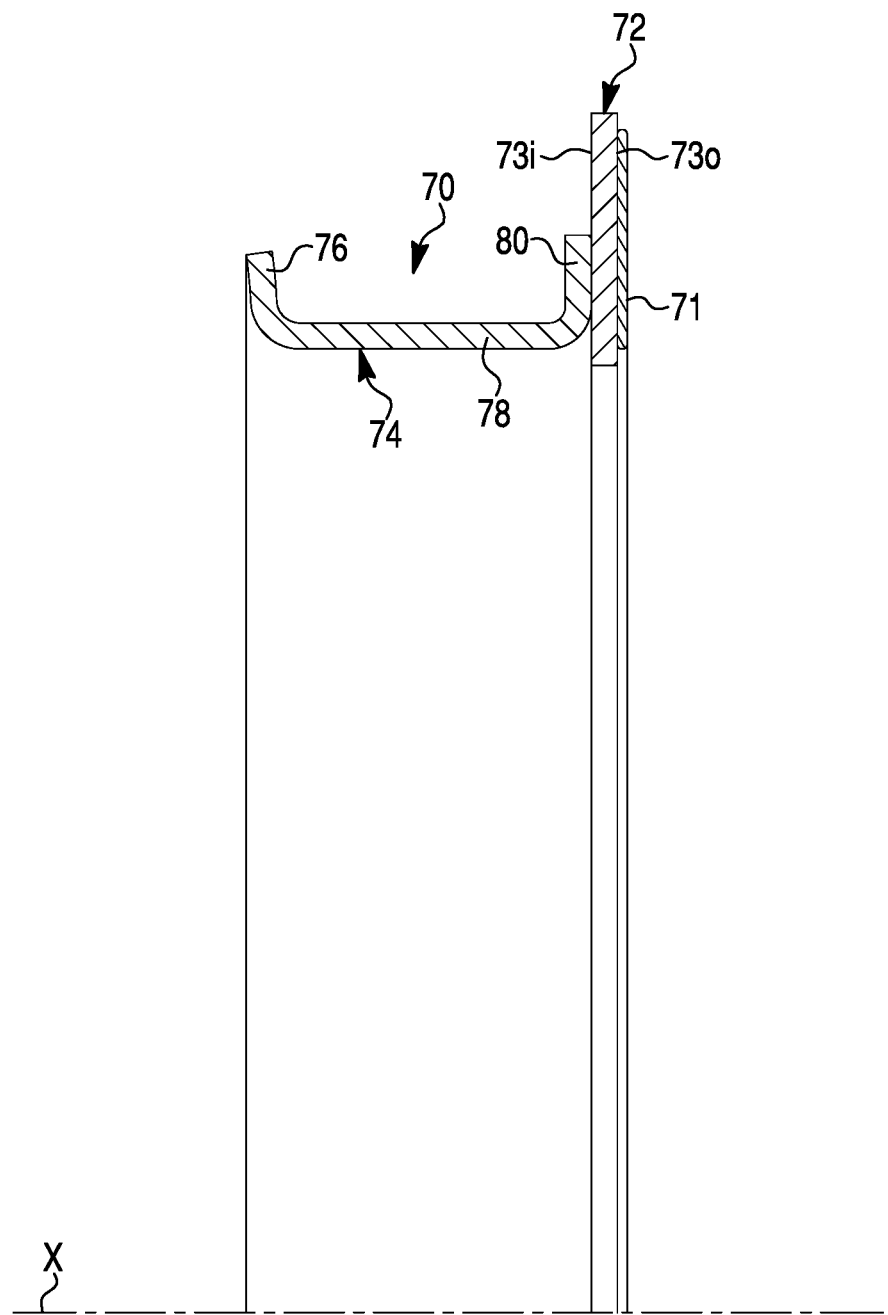
FIG. 4 is a fragmentary cross-sectional half-view of a clutch member of a locking clutch in accordance with the exemplary embodiment of the present invention.

The locking clutch 18 in accordance with the exemplary embodiment, includes a clutch member 70, best shown in FIG. 4, comprising a substantially annular clutch plate 72 coaxial with the rotational axis X, and a connecting member 74, which non-moveably connects the clutch plate 72 to the turbine-piston shell 35.

Figure 6:
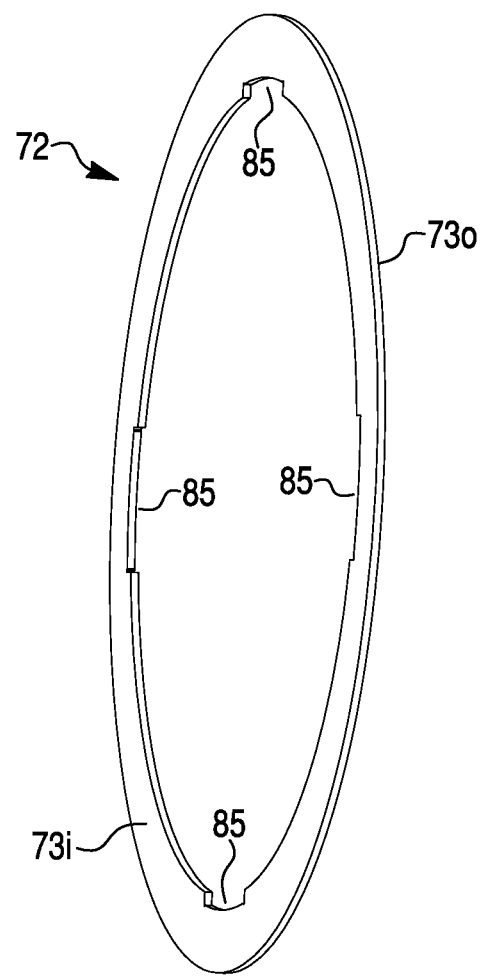
FIG. 6 is a perspective view of a clutch plate of the clutch member in accordance with the exemplary embodiment of the present invention.

The annular clutch plate 72, best shown in FIGS. 4 and 6, has an axially outer surface 73o facing the engagement surface 26 of the first sidewall $22_1$ of the casing 12, and an axially inner surface 73i facing the driven member 58 of the torsional vibration damper 16 and the turbine-piston shell 35 of the turbine-piston 32. According to the exemplary embodiment, both the axially outer surface 73o and the axially inner surface 73i of the annular clutch plate 72 are substantially perpendicular to the rotational axis X.

Figure 7:
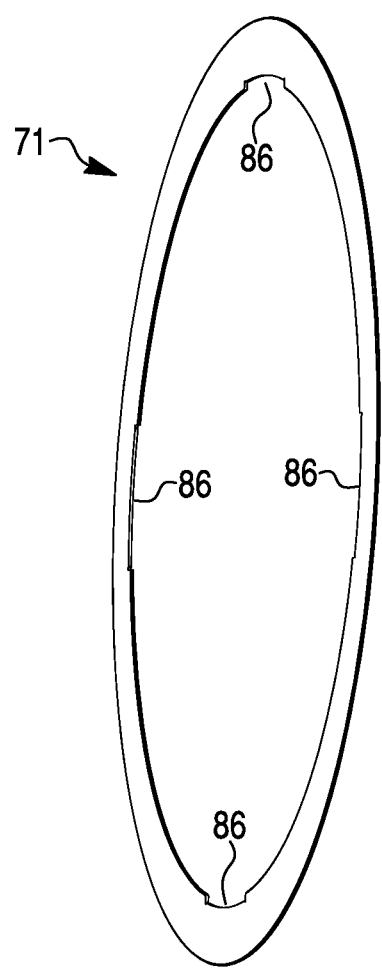
FIG. 7 is a perspective view of a friction lining of the clutch member in accordance with a third exemplary embodiment of the present invention.

In accordance with the exemplary embodiment, the axially outer surface 73o of the annular clutch plate 72 is provided with a friction ring (or friction lining) 71, best shown in FIG. 7, facing the engagement surface 26 of the casing 12. The friction ring 71 is fixedly secured to the axially outer surface 73o of the clutch plate 72, for example, by adhesive bonding and/or with fasteners. The friction ring 71 is made of a friction material for improved frictional performance. Alternatively, a friction ring (or friction lining) may be secured to the engagement surface 26. According to still another embodiment, a first friction ring or liner is secured to the engagement surface 26 of the casing 12 and a second friction ring or liner is secured to the axially outer surface 73o of the annular clutch plate 72. It is within the scope of the invention to omit one or both of the friction rings.

Figure 5:
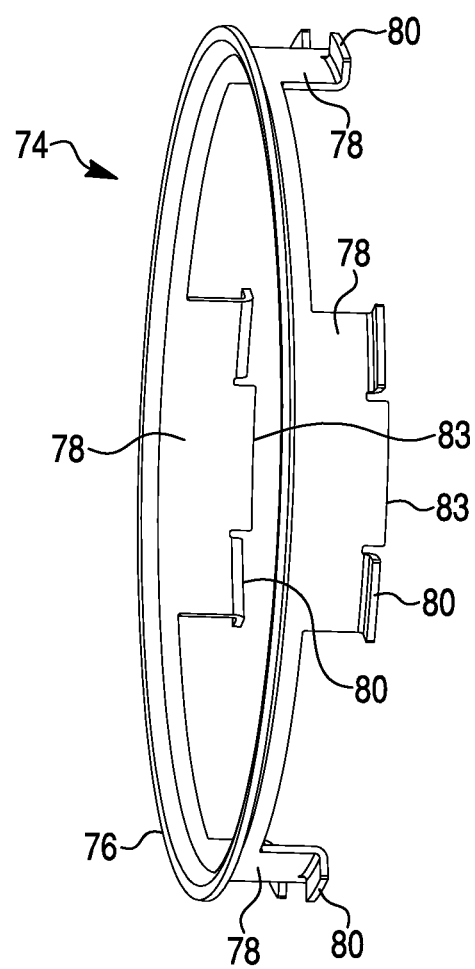
FIG. 5 is a perspective view of a connecting member of the clutch member in accordance with the exemplary embodiment of the present invention.

The connecting member 74 includes a substantially annular connecting ring 76 coaxial with the rotational axis X, and one or more connecting arms 78 extending axially from the connecting ring 76 and circumferentially equidistantly spaced from one another, as best illustrated in FIG. 5. The connecting ring 76 and the connecting arms 78 are embodied as integral with one another, e.g., made of a single or unitary component, but may be separate components non-moveably connected together, such as by metal stamping. According to the exemplary embodiment of FIGS. 1A and 1B, each of the connecting arms 78 extends in the direction substantially parallel to the rotational axis X.

As best shown in FIGS. 1A and 1B, the connecting ring 76 is fixedly secured to the turbine-piston shell 35 by appropriate means, such as by welding at weld 81 (shown in FIGS. 1A and 1B), or mechanical fasteners. Moreover, axially distal ends 80 of the connecting arms 78 (i.e., axially distal from the connecting ring 76) are fixedly secured to the axially inner surface 73i of the annular clutch plate 72, as best shown in FIG. 4, by appropriate means, such as by welding or adhesive bonding and/or with fasteners. In other words, the clutch member 70 is non-moveable relative to the turbine-piston 32, and the connecting arms 78 extend axially between the annular clutch plate 72 and the turbine-piston shell 35 of the turbine-piston 32.

As further illustrated in FIG. 5, each of the connecting arms 78 has a support tab 83 extending axially beyond the distal ends 80 for radially supporting and centering the annular clutch plate 72 and the friction ring 71 on the connecting member 74 of the clutch member 70. Moreover, the annular clutch plate 72 includes one or more support notches 85 complementary to the support tab(s) 83 of the connecting member 74, as best shown in FIG. 6. Similarly, the friction ring 71 includes one or more support notches 86 complementary to the support tab(s) 83 of the connecting member 74 and the support notch(es) 85 of the annular clutch plate 72, as best shown in FIG. 7. In an assembled condition, the annular clutch plate 72 and the friction ring 71 are mounted on the connecting member 74 so that the support tabs 83 of the connecting member 74 are disposed in both the support notches 85 of the annular clutch plate 72 and the support notches 86 of the friction ring 71 for radially supporting and centering the annular clutch plate 72 and the friction ring 71 on the connecting member 74.

Furthermore, in an assembled condition of the hydrokinetic torque coupling device 10, each of the connecting arms 78 extends axially through one of the circumferentially extending slots 66 in the driven plate 62 of the driven member 58, as shown in FIGS. 1A and 1B. In other words, the slots 66 in the driven member 58 give the clutch member 70 a certain freedom of relative rotational and linear movement in the direction around and along the rotational axis X, respectively. Accordingly, the clutch member 70 is rotatable (to a certain angle) relative to the driven member 58 around the rotational axis X and axially moveable relative to the driven member 58 along the rotational axis X.

As illustrated in FIGS. 1A and 1B, the turbine-piston 32 further includes an annular seal 48, such as an elastomeric lip seal, mounted on the radially outer peripheral end $35_1$ of the turbine-piston shell 35. As best shown in FIG. 1B, a lip 49 of the elastomeric lip seal 48 rests upon (i.e., slidably engage) the radially inner cylindrical surface 25 of the casing 12, or opposite an annular groove 28 arranged in the cylindrical surface 25, depending on an axial position of the turbine-piston 32.

Figure 8A:
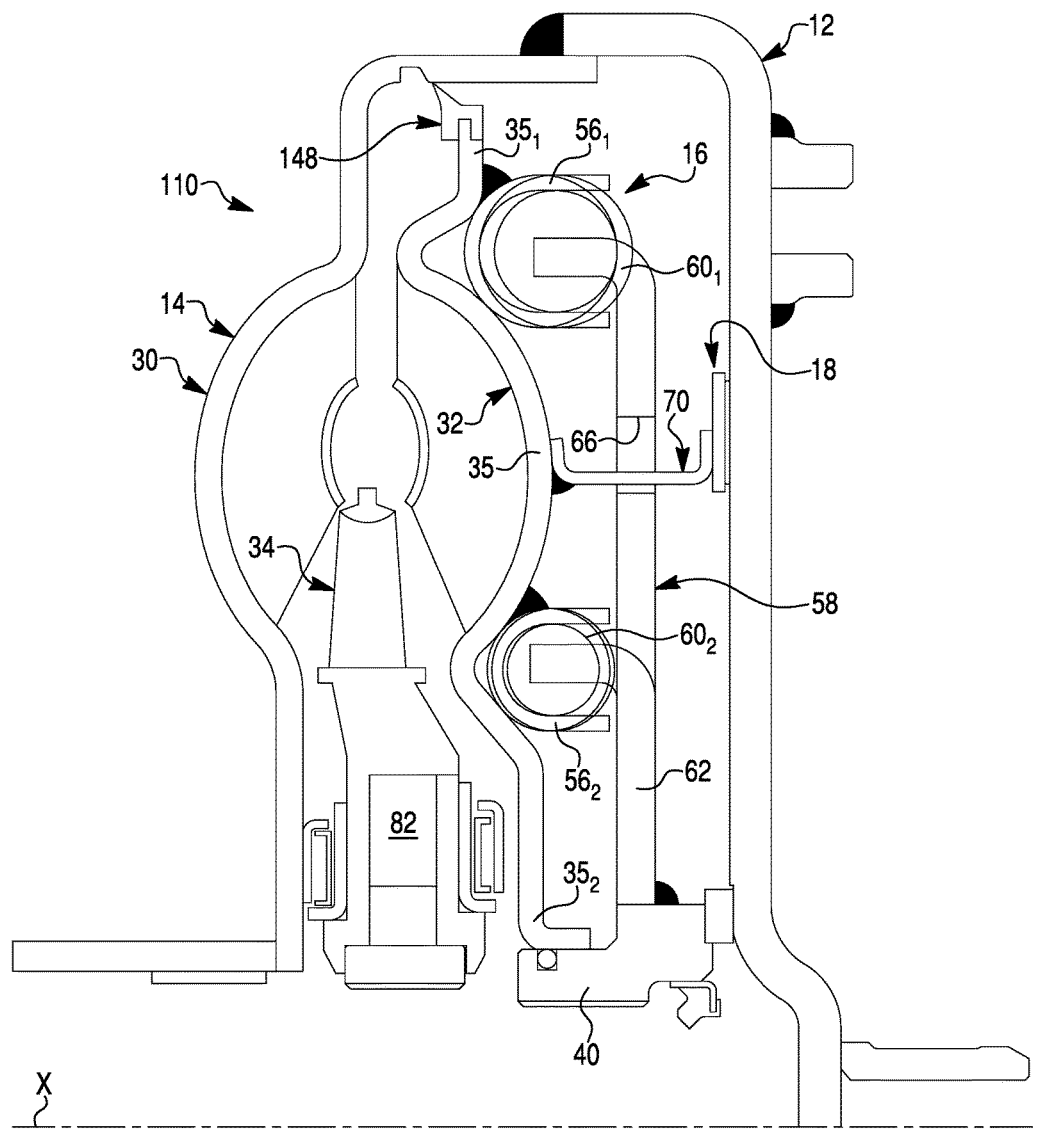
FIG. 8A is a fragmented half-view in axial section of a hydrokinetic torque coupling device in accordance with an alternative exemplary embodiment of the present invention in a lock-up mode.
Figure 8B:
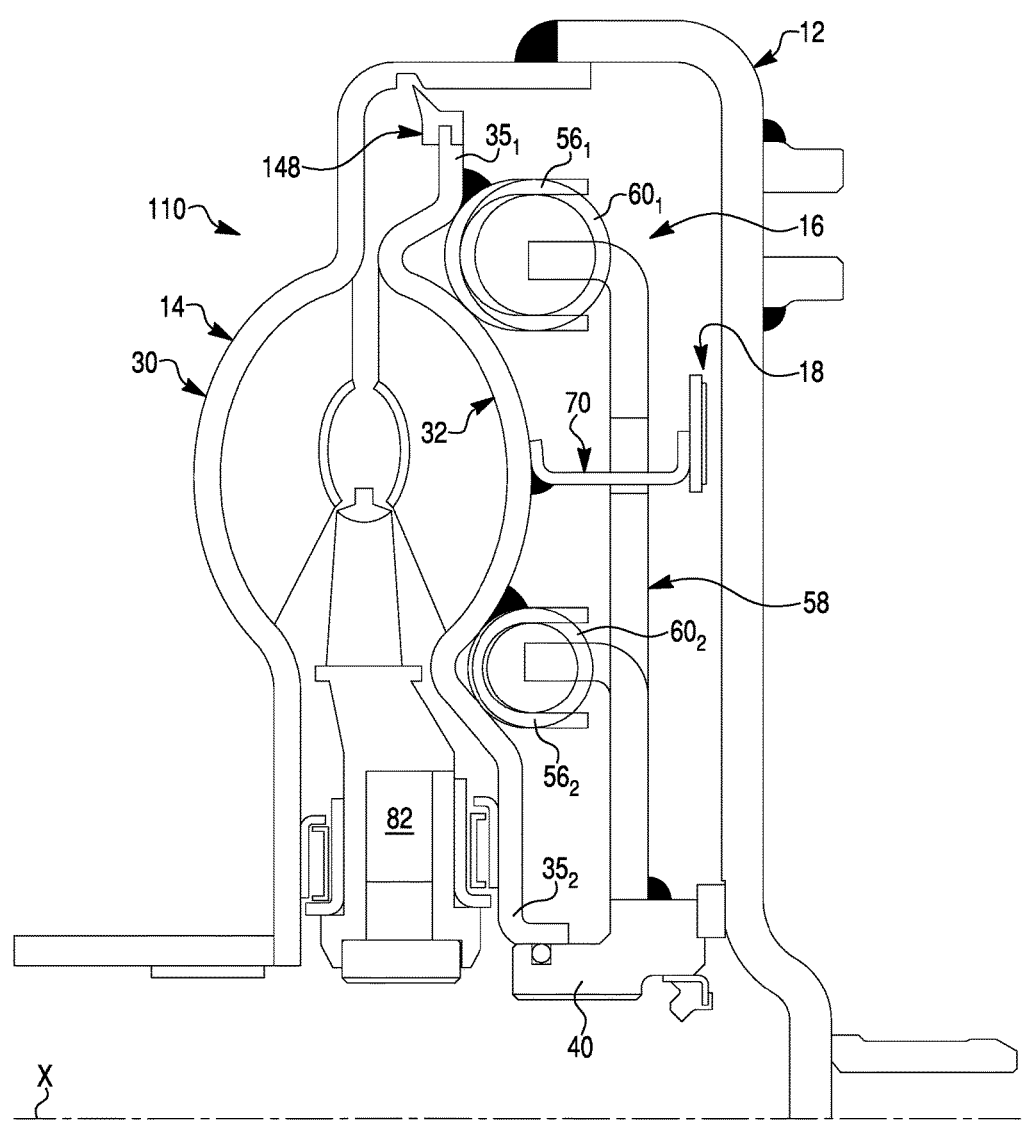
FIG. 8B is a fragmented half-view in axial section of the hydrokinetic torque coupling device in accordance with the alternative exemplary embodiment of the present invention in a non-lock-up mode.

According to the exemplary embodiment of FIGS. 1A-2B, the elastomeric lip seal 48 is adhesively bonded to the radially outer peripheral end $35_1$ of the turbine-piston shell 35 by an adhesive material 51. According to an alternative embodiment of the present invention illustrated in of FIGS. 8A and 8B, an elastomeric lip seal 148, substantially similar to the elastomeric lip seal 48, is over-molded onto the radially outer peripheral end $35_1$ of the turbine-piston shell 35 of a hydrokinetic torque coupling device 110.

According to the exemplary embodiment of the present invention, the lip 49 is tilted axially rearward and radially outward. A front end of the annular groove 28 has a surface 29 inclined in the same direction as the lip 49, so as to gradually follow the deformation of the lip 49 when the elastomeric seal 48 axially moves from the groove 28 towards the cylindrical surface 25.

The turbine-piston 32 is axially moveable from the disengaged position (non-lockup mode) of the locking clutch 18, illustrated in FIG. 1B, in which the turbine-piston 32 and the impeller 30 are axially moved closer to one another and rotationally disengaged from one another (i.e., the turbine-piston 32 and the impeller 30 are rotatable relative to one another), and the engaged position (lockup mode), illustrated in FIG. 1A, in which the clutch plate 72 with the friction lining 71 of the clutch member 70 frictionally non-rotatably engages the engagement surface 26 of the casing 12 so as to non-rotatably connect the turbine-piston 32 to the casing 12, thus non-rotatably couple the turbine-piston 32 and the impeller 30 to one another.

Figure 2A:
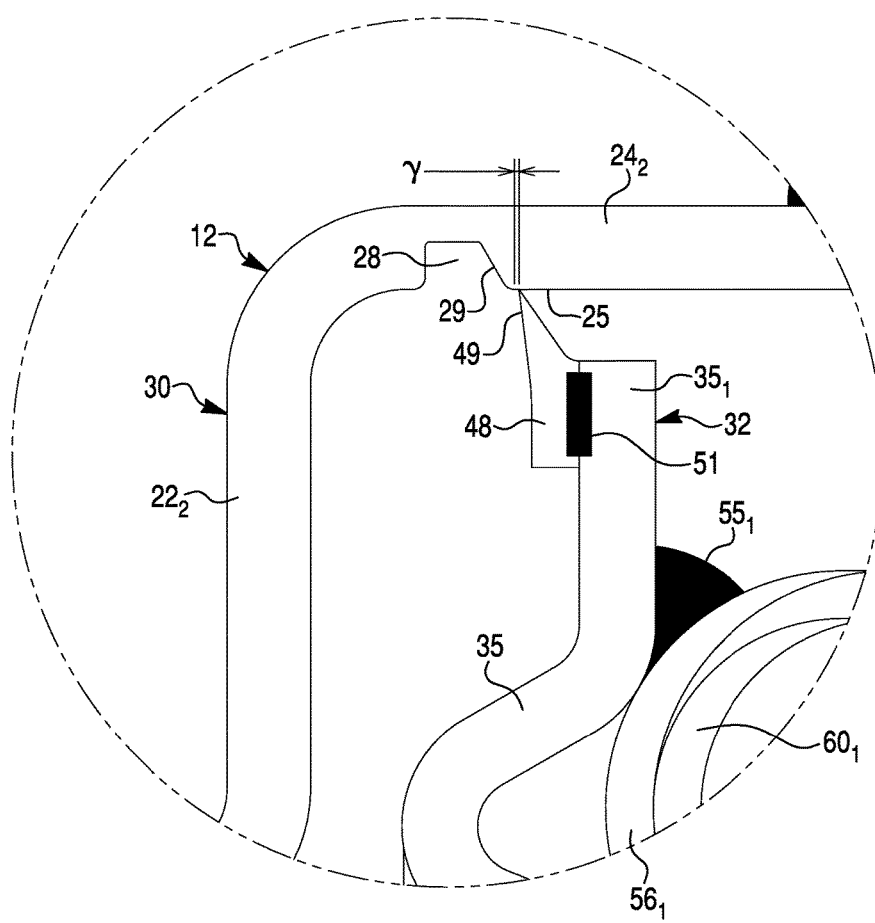
FIG. 2A is an enlarged view of a fragment of the hydrokinetic torque coupling device shown in the circle "2A" of FIG. 1A.
Figure 2B:
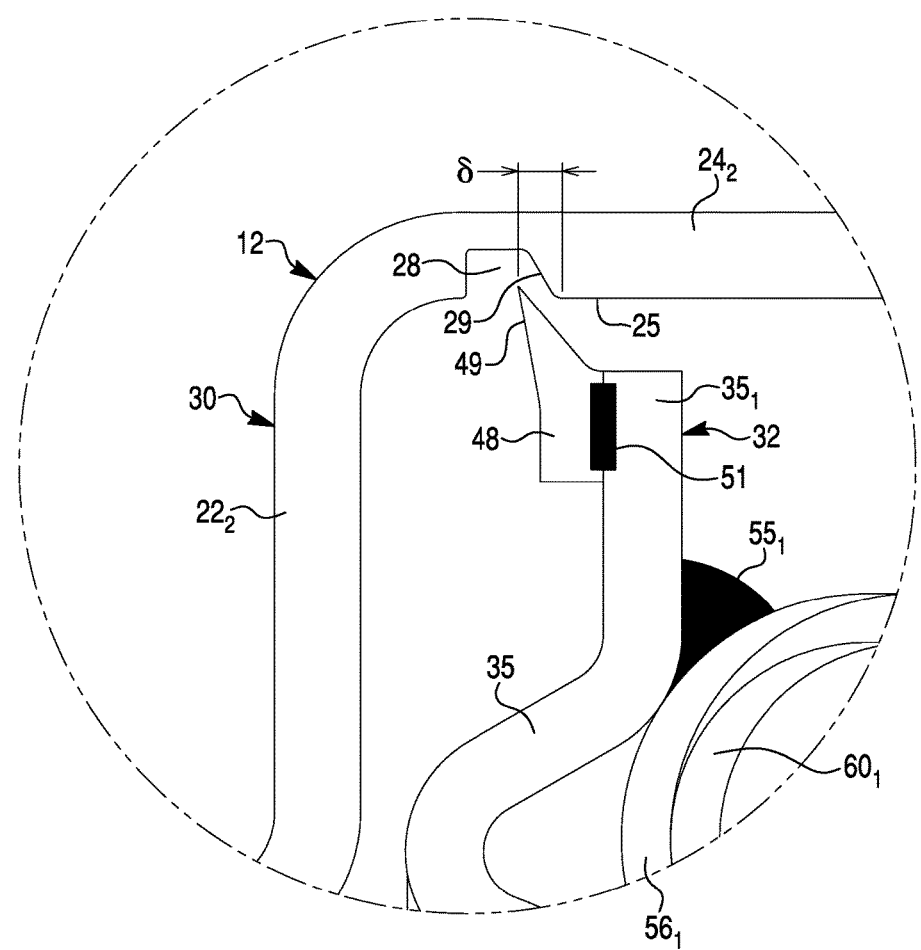
FIG. 2B is an enlarged view of a fragment of the hydrokinetic torque coupling device shown in the circle "2B" of FIG. 1B.

The motion of the turbine-piston 32 is controlled by the pressure differential between the pressure chambers 52, 54 positioned on either side of the turbine-piston 32 and separated from one another by the elastomeric lip seal 48. In the disengaged position (non-lockup mode), the axial position of the turbine-piston 32 is such that the lip 49 of the seal 48 faces the groove 28 (FIG. 2B). Thus the seal 48 does not rest on (i.e., does not engage) the second casing shell $20_2$ of the casing 12. On the contrary, in the engaged position (lockup mode), the axial position of the turbine-piston 32 is such that the lip 49 of the seal 48 rests on the radially inner cylindrical surface 25 of the annular outer wall portion 24 of the casing 12, so as to seal the pressure chambers 52 and 54.

In the disengaged position (non-lockup mode) of the locking clutch 18, an axial clearance Δ between the friction lining 71 of the clutch member 70 and the engagement surface 26 of the casing 12 is greater than the clearance δ between the lip 49 of the seal 48 and a front end of the annular groove 28 nearest to the radially outer peripheral end $35_1$ of the turbine-piston shell 35 (as best shown in FIGS. 1B and 2B). In other words, Δ>δ. According to the exemplary embodiment of the present invention, the clearance Δ is approximately 2 mm, while the clearance δ is approximately 1.8 mm. This differential secures the resting of the lip 49 on the cylindrical surface 25 in the engaged position (as best shown in FIG. 2A). It should also be noted that, in case of wear of the friction lining 71, the clearance Δ is increased, according to the above-mentioned principle. On the other hand, a distance y between the lip 49 of the seal 48 and the front end of the annular groove 28 in the casing 12 in the engaged position (lockup mode) (as best shown in FIG. 2A) is equal to Δ−δ. Also, the distance k between the turbine-piston shell 35 and the first thrust bearing $84_1$ in the lockup mode of the lockup clutch 18 (as shown in FIG. 1A) equals to the axial clearance Δ in the non-lockup mode of the lockup clutch 18 (as shown in FIG. 1B), i.e., k=Δ.

In the lockup mode, the turbine-piston 32 is axially displaced away from the impeller 30 and toward the engagement surface 26 of the casing 12 due to the pressure differential between the torus chamber 52 and the damper chamber 54. As a result, the axially outer surface 73o of the clutch plate 72 of the clutch member 70 (or the friction ring 71 secured thereto) and the engagement surface 26 of the casing 12 are pressed together, such that the clutch member 70 is frictionally non-rotatably coupled to the engagement surface 26 of the casing 12, thereby mechanically locking the turbine-piston 32 to the casing 12. When not in the lockup mode, the outer surface 73o of the clutch plate 72 of the clutch member 70 and the engagement surface 26 of the casing 12 are spaced from one another by the axial clearance Δ (best shown in FIG. 1B), such that the turbine-piston 32 is not frictionally non-rotatably coupled to the casing 12. In the non-lockup mode, normal operation of the torque converter 14 fluidly couples and decouples the impeller 30 to and from the turbine-piston 32.

As discussed above, the turbine-piston 32 is axially movable toward and away from the impeller 30 between the engaged position and the disengaged (open) position. Axial movement of the turbine-piston 32 is accomplished by changing the pressure differential between the opposite sides of the turbine-piston shell 35. A pressure increase in the damper chamber 54 relative to the torus chamber 52 (or stated differently, a pressure decrease in the torus chamber 52 relative to the damper chamber 54) shifts the turbine-piston 32 axially in the direction towards the cover shell $20_1$ of the casing 12, that is left to right in FIGS. 1A and 1B, into the engaged position. On the other hand, a pressure decrease in the damper chamber 54 relative to the torus chamber 52 (or stated differently a pressure increase in the torus chamber 52 relative to the damper chamber 54) shifts the turbine-piston shell 35 and the drive members $56_k$, $56_2$ affixed thereto axially towards the impeller 30, that is right to left in FIGS. 1A and 1B, out of the lockup mode. Pressure changes are created by control of the fluid, e.g., hydraulic fluid or oil, in the chambers 52 and 54.

In the lockup mode, the turbine-piston shell 35 is displaced axially away from the impeller 30 until the frictional ring 71 of the clutch plate 72 of the clutch member 70 (which moves axially with the turbine-piston shell 35) abuts against and is non-rotatably frictionally coupled to the engagement surface 26 of the casing 12. In the lockup mode, torque is transferred from the engine to the casing 12, then by way of the frictional engagement between the casing 12 and the clutch plate 72 of the clutch member 70 (or the frictional lining 71 thereof) to the drive members $56_k$, $56_2$ welded to the turbine-piston shell 35, then serially to the damper assembly 16 and the output hub 40. Thereby, the engagement surface 26 of the casing 12 and the clutch plate 72 with the frictional lining 71 of the clutch member 70 together define the lockup clutch 18 that bypasses the hydrodynamic fluid coupling of the torque converter 14 and mechanically couples the driving and driven shafts. Moreover, the friction ring 71 secured to the s the axially outer surface 73o of the clutch plate 72 may have a plurality of spaced grooves (not shown) for cooling friction surfaces of the lockup clutch 18 by the working fluid.

In the non-lockup mode, the turbine-piston 32 is displaced axially away from the cover shell $20_1$ of the casing 12, axially moving the turbine-piston shell 35 until the clutch plate 72 of the clutch member 70 (or the frictional lining 71 thereof) is spaced from and no longer non-rotatably frictionally coupled to the engagement surface 26 of the casing 12. Thus, torque transferred from the engine to the casing 12 in a hydrodynamic transmission mode does not bypass the torque converter 14 through the lockup clutch 18.

On the other hand, in the lockup mode, torque received by the clutch member 70 from the casing 12 is transmitted through the turbine-piston shell 35 and the drive members 56 fixed thereto, to the torsional vibration damper 16, then to the output hub 40, which is connected to the driven shaft, such as by splines 41. As the turbine-piston 32 and the drive members 56 move axially into and out of lockup position as described above, the driving arms 57 of the drive members 56 are axially displaced relative to the driven arms 64 of the driven member 58 (illustrated in FIGS. 1A and 1B). The relative axial movement between the driving arms 57 and the driven arms 64 allows the driven member 58 to remain fixed axially on the output hub 40 while the turbine-piston 32, the drive members 56 and the elastic damping members 60 move in the axial direction.

In operation, the lockup clutch 18 is generally activated after the hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup modes, the turbine-piston shell 35 may be somewhat thicker than typical turbine shells that do not form or function as the lockup piston. Although not shown, a biasing member, such as a spring (e.g., a washer spring), may be included in the hydrokinetic torque coupling device 10 to axially urge the turbine-piston 32 into or out of lockup mode.

The turbine-piston 32 with the clutch member 70 forms both the shell component of the turbine and the piston component of the lockup clutch, as described above. By consolidating two components that are normally separate from one another into a single component and placing the clutch member 70 generally radially in the middle of the casing 12, space is saved in the hydrokinetic torque coupling device 10. This space-saving structure provides several design advantages. For example, the hydrokinetic torque coupling device 10 can be made smaller and lighter. Alternatively, the free space within the casing 12 can be used to add additional components, such as damping components.

An exemplary method for assembling the hydrokinetic torque coupling device 10 of the first exemplary embodiment of FIGS. 1-7 will now be explained. While the methods for assembling the hydrokinetic torque coupling device 10 may be practiced by sequentially performing the steps as set forth below, it should be understood that the methods may involve performing the steps in different sequences. It should be understood that this exemplary method may be practiced in connection with the other embodiments described herein. This exemplary method is not the exclusive method for assembling the hydrokinetic torque coupling devices described herein.

The exemplary method for assembling the hydrokinetic torque coupling device 10 of the first exemplary embodiment of FIGS. 1-7 is as follows. The impeller 30, the turbine-piston 32, the stator 34, the clutch member 70 and the damper 16 may each be preassembled. The turbine-piston 32 includes, as noted above, the turbine-piston shell 35 and the turbine blades 36 attached to the turbine-piston shell 35. The driven plate 62 of the driven member 58 of the torsional vibration damper 16 is formed with the circumferentially extending slots 66 spaced circumferentially equidistantly from one another around the rotational axis X.

The drive members 56 are fixedly secured to the turbine-piston shell 35 by appropriate means, such as by continuous or spot welding at the weld 55. Then, the connecting ring 76 of the connecting member 74 is fixedly secured to the turbine-piston shell 35 by appropriate means, such as by continuous or spot welding at the weld 81. Next, the driven member 58 of the torsional vibration damper 16 is mounted to the drive members 56 through the elastic damping members 60 by extending the connecting arms 78 of the connecting member 74 of the clutch member 70 through the slots 66 in the driven plate 62. Subsequently, the annular clutch plate 72 with the friction lining 71 is non-moveably attached to the axially distal ends 80 of the connecting arms 78 of the connecting member 74 by welding or adhesive bonding and/or with fasteners. Specifically, the annular clutch plate 72 is mounted on the connecting arms 78 of the connecting member 74 (before welding or adhesive bonding) so that the support tabs 83 of the connecting arms 78 of the connecting member 74 engage the support notches 85 of the annular clutch plate 72. Similarly, the friction lining 71 is mounted on the connecting arms 78 of the connecting member 74 before fixing so that the support tabs 83 of the connecting arms 78 of the connecting member 74 engage the support notches 86 of the friction lining 71. Then, the driven member 58 of the torsional vibration damper 16 is non-rotatably secured to the output hub 40, such as by welding or fasteners.

After that, the cover shell $20_1$ is sealingly fixed to the impeller shell $20_2$ of the casing 12, such as by welding 19 at their outer peripheries, so that the torque converter 14 with the torsional vibration damper 16 and the lock-up clutch 18 are sealed within the casing 12.

Various modifications, changes, and alterations may be practiced with the above-described embodiment.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the torque coupling device comprising:
    a casing rotatable about a rotational axis and having an interior volume, the casing comprising a casing shell and an impeller shell disposed axially opposite to and fixedly connected to the casing shell, the casing having an engagement surface;
    an impeller coaxially aligned with the rotational axis and comprising the impeller shell;
    a turbine-piston coaxially aligned with and hydro-dynamically drivable by the impeller, the turbine-piston comprising a turbine-piston shell;
    a damper assembly comprising a drive member non-moveably connected to the turbine-piston, a driven member elastically coupled to the drive member and elastic damping members elastically coupling the drive member to the driven member; and
    a clutch member comprising a clutch plate and a connecting member non-moveably interconnecting the clutch plate with the turbine-piston, the clutch plate having an axially outer surface facing the engagement surface of the casing;
    the turbine-piston being axially displaceable relative to the casing to move the axially outer surface of the clutch member axially toward and away from the engagement surface of the casing for positioning the hydrokinetic torque coupling device into and out of a lockup mode in which the clutch member and the casing frictionally interlock with one another so that the casing is mechanically locked to and non-rotatable relative to the turbine-piston;
    the connecting member of the clutch member extending through the damper assembly so as to be rotatable around the rotational axis and axially moveable along the rotational axis relative to the driven member of the damper assembly.

2. The hydrokinetic torque coupling device as defined in claim 1, wherein the driven member is provided with a plurality of circumferentially extending slots spaced circumferentially equidistantly from one another around the rotational axis, and wherein the connecting member of the clutch member extends through the slots in the driven member.

3. The hydrokinetic torque coupling device as defined in claim 1, wherein the drive member includes axially extending driving arms circumferentially equidistantly spaced from one another, wherein the driven member includes a driven plate and driven arms integral with and axially extending from the driven plate, and wherein the elastic damping members are engaged between the driving arms of the drive member and the driven arms of the driven member.

4. A hydrokinetic torque coupling device for coupling together a driving shaft and a driven shaft, the torque coupling device comprising:
    a casing rotatable about a rotational axis and having an interior volume, the casing comprising a casing shell and an impeller shell disposed axially opposite to and fixedly connected to the casing shell, the casing having an engagement surface;
    an impeller coaxially aligned with the rotational axis and comprising the impeller shell;
    a turbine-piston coaxially aligned with and hydro-dynamically drivable by the impeller, the turbine-piston comprising a turbine-piston shell;
    a damper assembly comprising a drive member non-moveably connected to the turbine-piston and a driven member elastically coupled to the drive member;
    a clutch member comprising a clutch plate and a connecting member non-moveably interconnecting the clutch plate with the turbine-piston, the clutch plate having an axially outer surface facing the engagement surface of the casing; and
    a seal mounted to a radially outer periphery of the turbine-piston shell of the turbine-piston, the seal being configured to engage a radially inner surface of the casing disposed radially outside the turbine-piston in the lockup mode;
    the turbine-piston being axially displaceable relative to the casing to move the axially outer surface of the clutch member axially toward and away from the engagement surface of the casing for positioning the hydrokinetic torque coupling device into and out of a lockup mode in which the clutch member and the casing frictionally interlock with one another so that the casing is mechanically locked to and non-rotatable relative to the turbine-piston.

5. The hydrokinetic torque coupling device as defined in claim 4, wherein the seal is configured to be disengaged from the radially inner surface of the casing in a non-lockup mode.

6. The hydrokinetic torque coupling device as defined in claim 5, wherein the casing includes an annular groove arranged in the radially inner surface of the casing, and wherein the seal is configured to be positioned radially opposite the annular groove in the non-lockup mode.

7. The hydrokinetic torque coupling device as defined in claim 6, wherein the seal is an annular lip seal.

8. The hydrokinetic torque coupling device as defined in claim 1, wherein the axially outer surface facing the engagement surface of the casing further includes an annular friction lining fixedly attached to the axially outer surface of the clutch plate so as to face the engagement surface of the casing.

9. A hydrokinetic torque coupling device for coupling together a driving shaft and a driven shaft, the torque coupling device comprising:
   a casing rotatable about a rotational axis and having an interior volume, the casing comprising a casing shell and an impeller shell disposed axially opposite to and fixedly connected to the casing shell, the casing having an engagement surface;
   an impeller coaxially aligned with the rotational axis and comprising the impeller shell;
   a turbine-piston coaxially aligned with and hydro-dynamically drivable by the impeller, the turbine-piston comprising a turbine-piston shell;
   a damper assembly comprising a drive member non-moveably connected to the turbine-piston and a driven member elastically coupled to the drive member; and
   a clutch member comprising a clutch plate and a connecting member non-moveably interconnecting the clutch plate with the turbine-piston, the clutch plate having an axially outer surface facing the engagement surface of the casing;
   the turbine-piston being axially displaceable relative to the casing to move the axially outer surface of the clutch member axially toward and away from the engagement surface of the casing for positioning the hydrokinetic torque coupling device into and out of a lockup mode in which the clutch member and the casing frictionally interlock with one another so that the casing is mechanically locked to and non-rotatable relative to the turbine-piston;
   the connecting member of the clutch member including a substantially annular connecting ring coaxial with the rotational axis and a plurality of connecting arms extending axially from the connecting ring and circumferentially equidistantly spaced from one another;
   the connecting ring being non-moveably secured to the turbine-piston, and the connecting arms extending through the damper assembly.

10. The hydrokinetic torque coupling device as defined in claim 9, wherein the driven member is provided with a plurality of circumferentially extending slots spaced circumferentially equidistantly from one another around the rotational axis, and wherein the connecting arms of the connecting member of the clutch member extend through the slots in the driven member.

11. The hydrokinetic torque coupling device as defined in claim 10, wherein the connecting arms of the connecting member of the clutch member extend through the damper assembly so as to be rotatable around the rotational axis and axially moveable along the rotational axis relative to the driven member of the damper assembly.

12. The hydrokinetic torque coupling device as defined in claim 11, wherein the driven member includes a driven plate, and wherein the connecting arms of the connecting member of the clutch member extend through the slots in the driven plate of the driven member.

13. A method for assembling a hydrokinetic torque coupling device for coupling together a driving shaft and a driven shaft, the method comprising the steps of:
   providing a torque converter comprising an impeller and a turbine-piston coaxially aligned with and hydrodynamically drivable by the impeller;
   providing a damper assembly comprising a drive member non-moveably connected to the turbine-piston and a driven member elastically coupled to the drive member; and
   providing a clutch member comprising a clutch plate and a connecting member;
   non-moveably securing the drive member of the damper assembly to the turbine-piston;
   non-moveably securing the connecting member of the clutch member to the turbine-piston;
   mounting the driven member of the damper assembly to the drive member through the elastic damping members by extending the connecting member of the clutch member through the damper assembly; and
   non-moveably securing the clutch plate to the connecting member.

14. The method as defined in claim 13, wherein the driven member of the damper assembly includes a plurality of circumferentially extending slots spaced circumferentially equidistantly from one another around the rotational axis, and wherein the connecting member of the clutch member extends through the circumferentially extending slots in the driven member of the damper assembly.

15. The method as defined in claim 14, wherein the connecting member of the clutch member includes a substantially annular connecting ring coaxial with the rotational axis and a plurality of connecting arms extending axially from the connecting ring and circumferentially equidistantly spaced from one another.

16. The method as defined in claim 15, wherein the step of non-moveably securing the connecting member of the clutch member to the turbine-piston includes the step of non-moveably securing the connecting ring to the turbine-piston so that the connecting arms of the connecting member of the clutch member extend through the slots in the driven member.

17. The method as defined in claim 16, wherein the driven member includes a driven plate formed with the slots, and wherein the connecting arms of the connecting member of the clutch member extend through the slots in the driven plate of the driven member.

18. The method as defined in claim 17, further comprising the step of non-rotatably securing a casing shell to an impeller shell of the torque converter to form a casing housing the turbine-piston and the torsional vibration damper.

* * * * *